United States Patent [19]
Granada

[11] 3,756,126
[45] Sept. 4, 1973

[54] SEALING RING

[75] Inventor: Richard Paul Granada, West Covina, Calif.

[73] Assignee: International Telephone and Telegraph Corporation, New York, N.Y.

[22] Filed: Jan. 20, 1972

[21] Appl. No.: 219,431

Related U.S. Application Data

[62] Division of Ser. No. 39,281, May 21, 1970, abandoned.

[52] U.S. Cl. ................................................. 92/38
[51] Int. Cl. ............................................ F01b 19/00
[58] Field of Search ............... 92/38; 277/177, 207, 277/70, 136, 137, 83, 201, 202, 215, DIG. 2; 251/DIG. 1; 285/DIG. 19

[56] References Cited
UNITED STATES PATENTS

| | | | |
|---|---|---|---|
| 2,873,132 | 2/1959 | Tanner | 277/207 X |
| 2,521,248 | 9/1950 | Parker | 277/177 |
| 2,247,609 | 7/1941 | Deuilbiss | 277/207 |
| 2,917,081 | 12/1959 | Nolte | 92/38 |
| 3,542,377 | 11/1970 | Voitik | 277/92 |
| 2,889,183 | 6/1959 | Peras | 309/33 |
| 3,476,398 | 11/1969 | Schanz | 277/162 |
| 3,107,922 | 10/1963 | Nathan | 277/168 |
| 3,197,216 | 7/1965 | Jackson | 277/137 |
| 2,690,360 | 9/1954 | Young | 308/36.1 |
| 2,928,425 | 3/1960 | Miller | 92/38 |

FOREIGN PATENTS OR APPLICATIONS

| | | | |
|---|---|---|---|
| 1,230,222 | 3/1960 | France | 277/207 |

Primary Examiner—Charles J. Myhre
Assistant Examiner—R. H. Lazarus
Attorney—C. Cornell Remsen, Jr. Thomas E. Kristofferson et al.

[57] ABSTRACT

An O-ring like seal for the overpressure valve of a differential pressure unit. The seal may be simply a conventional rubber O-ring with projections molded integrally therewith. The ring may be a geometric toroid defined by revolving a circle about an axis of revolution. The projections point radially away from the axis and are fixed to the toroid at its surface located furthest from the axis.

8 Claims, 9 Drawing Figures

3,756,126

SEALING RING

This application is a division of copending application Ser. No. 39,281 filed May 21, 1970, now abandoned, for SEALING RING. The benefit of the filing date of said copending application is, therefore, claimed for this application.

BACKGROUND OF THE INVENTION

This invention relates to O-ring type seals, and more particularly, to an improved seal for a differential pressure unit (DPU) or the like.

In the past, the overpressure valve of a DPU was sealed against an O-ring. The O-ring was a substantially perfect toroid and was located in an annular cavity in the DPU body. The cavity had a smooth cylindrical surface surrounding the O-ring. However, when the valve seated, the O-ring was pressed against the cylindrical surface. This causes what is called "lock-up." The O-ring seal to the cylindrical surface prevented the valve from moving thereafter.

A prior art solution to the problem of lock-up was to groove the cylindrical cavity surface. However, this is an expensive additional operation.

SUMMARY OF THE INVENTION

In accordance with the device of the present invention, the abovedescribed and other disadvantages of the prior art are overcome by providing an O-ring like seal with one or more radial projections.

Thus, the projections keep the O-ring from sealing to the said smooth cylindrical surface and prevent lock-up.

It is a special feature of the invention that the lock-up problem is solved at no additional cost because the O-ring projections may be molded integrally with the O-ring in a single process step.

The advantage of the invention, both as to its construction and mode of operation, will be readily appreciated as the same becomes better understood by reference to the following detailed description when considered in connection with the accompanying drawings in which like referenced numerals designate like parts throughout the figures.

BRIEF DESCRIPTION OF THE DRAWINGS

In the drawings which are merely illustrative.

DESCRIPTION OF THE PREFERRED EMBODIMENTS

Figure 1:
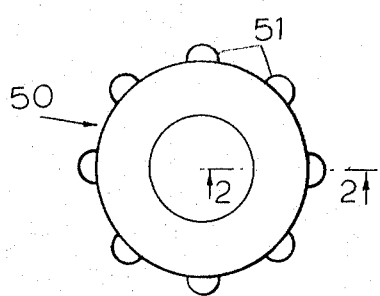
FIGS. 1, 3 and 5 are top plan views of O-ring seals constructed in accordance with three different embodiments of the invention, respectively.
Figure 2:
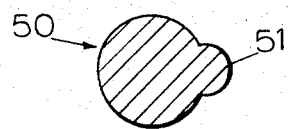
FIGS. 2, 4 and 6 are sectional views taken on the lines 2—2, 4—4, and 6—6 respectively, of the embodiments shown in FIGS. 1, 3 and 5, respectively.

In the drawings, in FIGS. 1 and 2, a rubber O-ring 50 is shown having hemispherical bulbs 51 molded intergrally therewith.

Figure 3:
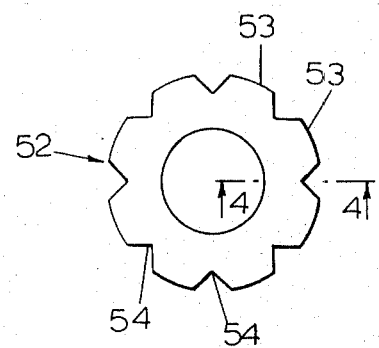
Figure 4:
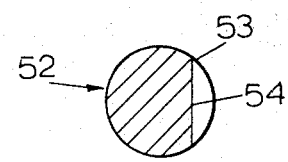

In FIGS. 3 and 4, a rubber O-ring 52 has projections 53 defined between grooves 54 cut in the O-ring.

Figure 5:
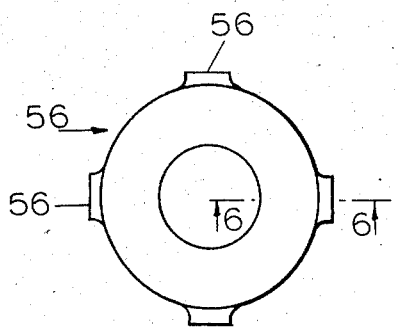
Figure 6:
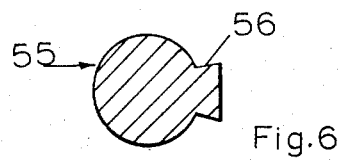

In FIGS. 5 and 6, a rubber O-ring 55 has axial rib shaped projections 56 molded integrally therewith.

Figure 7:
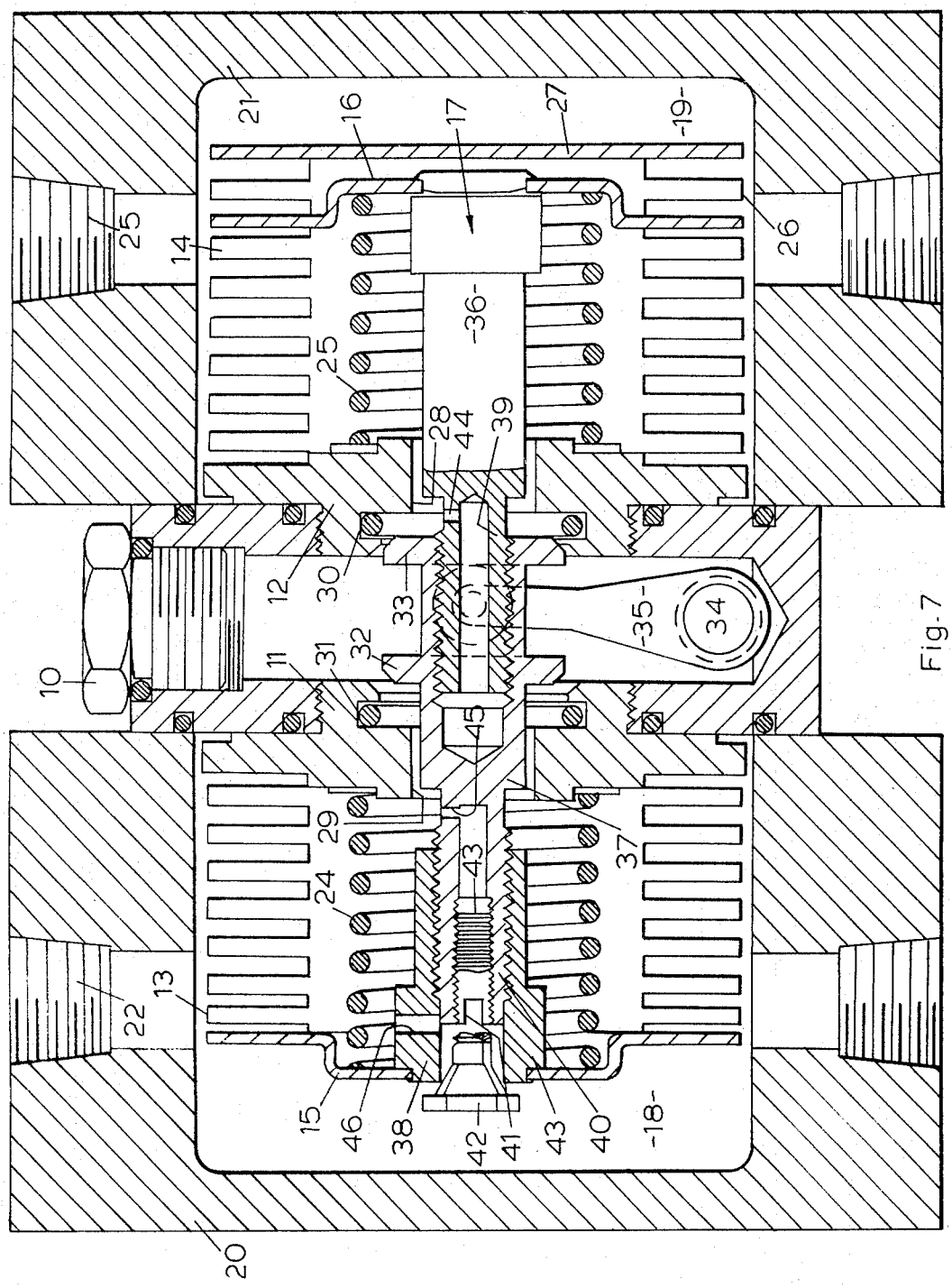
FIG. 7 is a sectional view of a DPU of the type shown in U. S. Pat. No. 2,928,425, with the seal of the present invention.

A central partition is generally indicated at 10 in FIG. 7 into which is threaded the bases 11 and 12 of two opposed metallic bellows 13 and 14. These bellows have their outer or movable ends 15 and 16, respectively, rigidly connected to each other by means of a rigid stem generally indicated at 17. The bellows 13 and 14 are disposed within pressure chambers 18 and 19 that are formed in housings 20 and 21 that are bolted or otherwise secured to the sides of the partition 10. The pressures between which a differential may exist are transmitted to the chambers 18 and 19 through inlets 22 and 23, respectively. Compression springs 24 and 25 are usually disposed within the bellows and bear on the bellows bases 11 and 12 and on the movable end caps 15 and 16, respectively. Usually, one of the bellows, such as the bellows 14 is equipped with an additional temperature compensating bellows 26 having a movable end 27 and the interior of this bellows is in communication through a small aperture, not shown, in the end cap 16 with the interior of bellows 14. This bellows merely enables expansion and contraction of the liquid confined within the bellows 13 and 14 to take place without affecting the calibration of the instrument when variations in temperature occur. The rigid stem 17 extends through passages 28 and 29 in the bellows bases 11 and 12, and consequently, extends through the partition 10. In the passages 28 and 29 there are opposed valve seats preferably provided by loosely confined rubber O-rings 30 and 31 constructed as shown in one of FIGS. 1, 3 and 5. On the stem 17 there are opposed valve closures 32 and 33, one of which is adapted to seat on its seat when the differential in pressures in the chambers 18 and 19 becomes excessive and beyond the range of the instrument. When the closure seats it tends to confine or entrap liquid in the bellows to prevent collapse of the bellows under the excessive pressure. A torque tube indicated at 34 having a crank 35 thereon is operatively connected to the stem 17 and serves to transmit movements of the rigid stem 17 to the exterior of the instrument when the stem is moved axially in response to differential pressures within the range of the instrument.

The stem 17 is divided into three parts 36, 37, and 38. The part 36 which is anchored to the movable end cap 16 of bellows 14 has a hollow threaded extension 39 that is threaded into part 37 which carries the valve closures 32 and 33. In a similar manner, part 37 has a tubular threaded extension 40 which is threaded into part 38 which is fastened to the end cap 15 of bellows 13.

The threads on the two tubular extensions 39 and 40 are identical or at least have the same pitch. The tubular extension 40 is equipped at its end with a screwdriver kerf or the equivalent indicated at 41 which is exposed when the conical closure 42 and its threaded stem 43 are removed from the end of the part 38. Consequently, with this arrangement, after the entire structure has been assembled together and it is found as a result of the various factors that stem 17 has been displaced, either to the right or to the left of its intended position, and the closures 32 and 33 are improperly arranged or positioned with respect to their respective seats 31 and 30, it is possible on removal of the closure 42 to rotate part 37, thus shifting or adjusting the closures 32 and 33 axially of the stem 17. During this adjustment, by reason of the fact that the threads on the two extensions 39 and 40 are identical, it will be appreciated that the overall length of the stem 17 is in no way altered or changed. When the closure 42 is re-applied after the adjustment the tightening of the closure causes the stem 43 to impose a tension on the extension 40 and function somewhat as a jamb nut to lock part 37 in adjusted position.

In the preferred form of construction vents or bleed ports 44, 45. amd 46 are provided to prevent air from becoming entrapped in the extensions and in the part 33 when the interiors of the bellows are evacuated and are filled with liquid.

It will thus be appreciated that by making the rigid stem 17 in three parts the middle part of which carries the valve closures 32 and 33 and having these parts connected together by identical threads, that axial adjustment of the closures 32 and 33 along the length of the stem can be easily and quickly accomplished by rotating the middle part of 37 by means of its screwdriver kerf 41.

The lock-up, as explained previously, prevents the DPU from operating because during lock-up stem 17 will not move. To prevent lock-up, or the O-ring from sealing along surface 57, in the prior art gooves were placed in surface 57 to allow fluid to escape from the low pressure bellows. Lock-up and the seal of O-ring 31 with surface 57 is prevented, according to the present invention, by projections 51, 53 or 56. In each case projections 51, 53 and 56 will abut surface 57 and keep the major portion or toroidal body of O-ring 31 from touching or sealing with surface 57.

The lock up problem is solved by O-rings 50, 52 and 55, with projections 51, 53 and 56, respectively. However, it is an additional advantage of the invention that projections 51, 53 and 56 may be molded integrally with O-rings 50, 52 and 55 in the same process step at no additional cost.

Only one of the projections 51, 53 and 56 need be provided, but preferably a plurality of equally spaced projections are employed. Note will be taken that three or more can locate an O-ring symetrically within the cavities within bases 11 and 12 defined between surfaces 57, 58 and 59, snugly or loosely.

Figure 8:
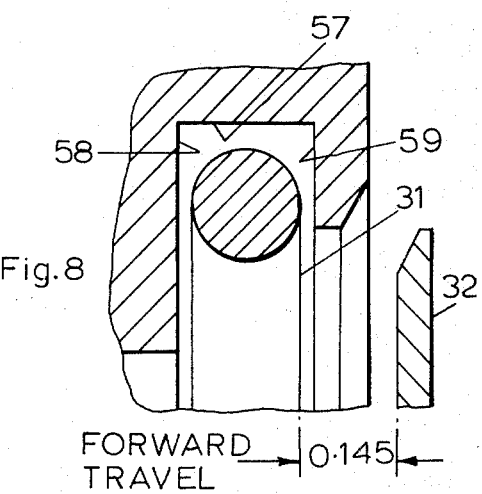
FIG. 8 is an enlarged sectional view of a portion of the DPU and the seal of the present invention shown in FIG. 7.

Note will be taken that FIG. 8 is an identical, although enlarged, portion of FIG. 7 including O-ring 31, and a few structures positioned in the vicinity thereof.

The differential pressure unit (DPU) and O-ring 50, 52 and 55 of the present invention may be constructed as shown in the drawings. Further, the DPU of the present invention may be entirely conventional except for O-rings 50, 52, 55, 30 and 31, and except that surface 57 may be a smooth cylindrical surface instead of a grooved one.

Figure 9:
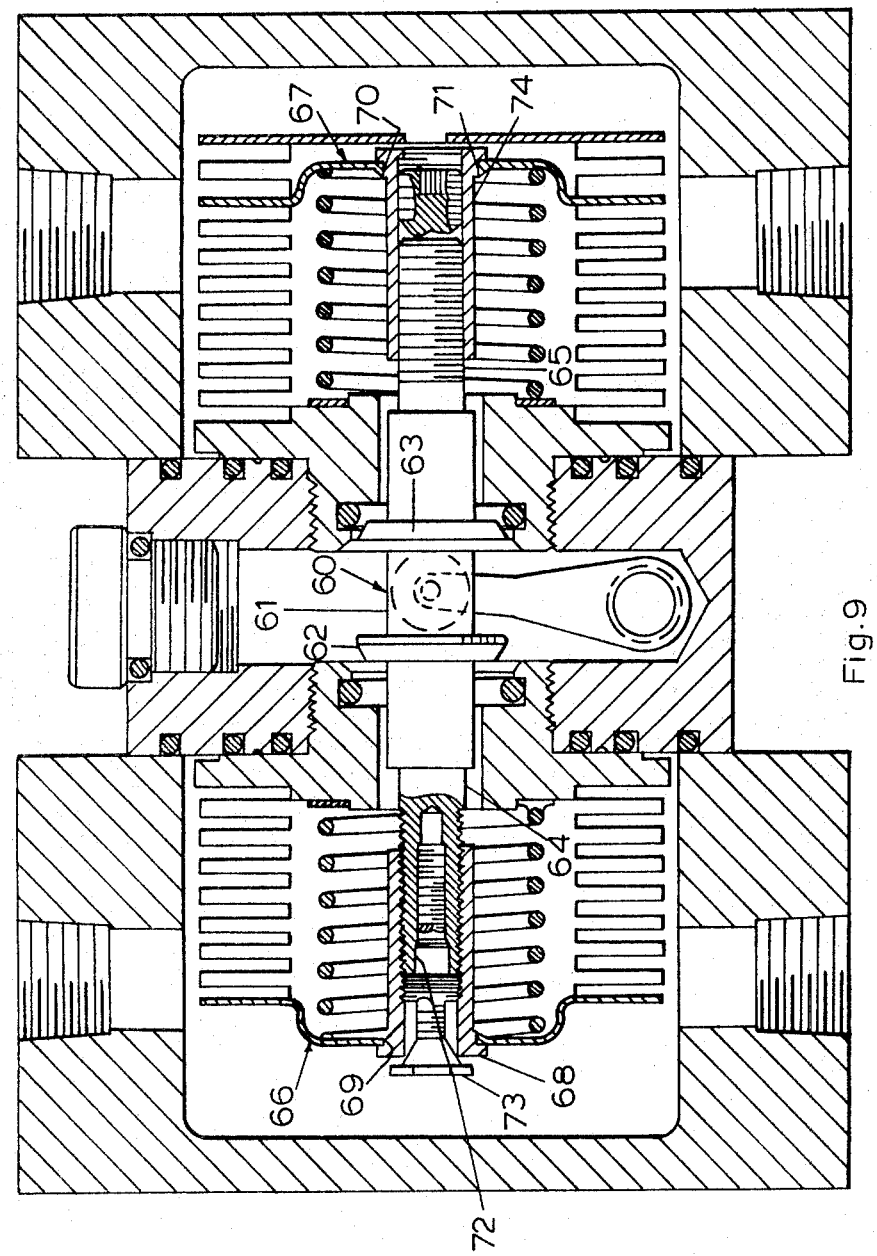
FIG. 9 is a side elevational view of a valve system, partly in section, constructed in accordance with the present invention.

In FIG. 9, an alternative valve stem is indicated at 60. Valve stem 60 includes a cylindrical body 61 to which valves 62 and 63 are fixed. Extensions 64 and 65 are fixed to the respective ends of body 61. Parts 61, 62, 63, 64 and 65 are made of a single piece of metal, and are thereby integral with one another. The movable end of one bellows is indicated at 66. The movable end of another bellows is indicated at 67. A hollow cylinder 68 is fixed to bellow 66 through a hole 69 therethrough. A cylinder 70 is fixed to disc 7 through a hole 71 therethrough. Valve stem portion 64 is threaded inside cylinder 68. Valve stem 65 is threaded inside cylinder 70. Valve stem portion 64 has an Allen head 72 for adjustment. A hex head sealing screw 73 is threaded inside valve stem portion 64. An Allen head set screw 74 is threaded inside cylinder 70 to fix the position of valve stem portion 65 relative thereto.

What is claimed is:

1. A differential pressure unit comprising: a body; pressure sensitive means in said body; a partition separating said body into at least first and second chambers; a valve stem connected to said means, said partition having a hole therethrough, said partition having an annular cavity at the position of said hole; a resilient O-ring like seal in said cavity; a valve on said valve stem in a position on one side of said seal, said annular cavity being larger than said seal to retain it loosely, said cavity opening inwardly toward said valve stem, said cavity having an axial surface against which said seal may be squeezed by said valve, said cavity having a circumferential surface which the extreme outer periphery of said seal may contact when it is squeezed as aforesaid; and a first projection fixed to said seal in a position to engage said circumferential surface when said seal is squeezed as aforesaid.

2. The invention as defined in claim 2, wherein said valve stem has a substantially symmetrical axis along which it moves, said axial surface lying in a plane perpendicular to said axis, said circumferential surface being a smooth cylindrical surface.

3. The invention as defined in claim 2, wherein said seal has the shape of a toroid except for said first projection.

4. The invention as defined in claim 3, wherein said seal has at least three projections in addition to said first projection, all of said projections being equally spaced and being integral with said seal.

5. The invention as defined in claim 4, wherein said projections are hemispherically shaped.

6. The invention as defined in claim 4, wherein said projections are defined between grooves in said seal.

7. The invention as defined in claim 4, wherein said projections are ribs extending in the direction of said axis.

8. The invention as defined in claim 1, wherein all portions of said valve stem are integral with one another, said valve stem being of a one-piece construction.

* * * * *